United States Patent [19]

Fukuhira et al.

[11] Patent Number: 5,227,979
[45] Date of Patent: Jul. 13, 1993

[54] METHOD OF DESIGNING CAVITY SHAPE OF MOLD

[75] Inventors: Makoto Fukuhira; Kimio Kubo, both of Mouka, Japan

[73] Assignee: Hitachi Metals, Ltd., Tokyo, Japan

[21] Appl. No.: 596,287

[22] Filed: Oct. 12, 1990

[30] Foreign Application Priority Data

Oct. 13, 1989 [JP] Japan .................................. 1-267376
Mar. 29, 1990 [JP] Japan .................................. 2-81948

[51] Int. Cl.$^5$ .................................................... G06F 15/46
[52] U.S. Cl. .................................... 364/476; 364/578; 264/328.7
[58] Field of Search ............... 364/476, 477, 510, 578, 364/468; 264/328.1, 328.2, 328.7, 40.6; 425/140-144, 149

[56] References Cited

U.S. PATENT DOCUMENTS

| | | | |
|---|---|---|---|
| 4,534,003 | 8/1985 | Manzione | 364/578 |
| 4,984,166 | 1/1991 | Akasaka et al. | 364/578 |
| 5,031,127 | 7/1991 | Fujita et al. | 364/578 |
| 5,097,432 | 3/1992 | Harada et al. | 364/476 |

OTHER PUBLICATIONS

Niiyama, E. "Casting," vol. 49, No. 10, 1977, pp. 608-613 (w/abridged translation).
Ohnaka, I. "Introduction of Heat Transfer and Solidification Analysis by Computers," 1985, pp. 202-203 (w/abridged translation).

Primary Examiner—Jerry Smith
Assistant Examiner—Thomas E. Brown
Attorney, Agent, or Firm—Finnegan, Henderson, Farabow, Garrett & Dunner

[57] ABSTRACT

The designing of a cavity shape of a mold by utilizing solidification analysis is conducted by (a) preparing a two-dimensional small element model of a casting to be produced in the cavity, the casting including an article portion and a portion connected thereto for feeding a melt to the article portion; (b) determining a solid fraction distribution of the model by conducting the unsteady heat transfer calculation by a heat flux method; (c) correcting the solid fraction distribution by taking into account the heat transfer in a direction perpendicular to the two-dimensional model; (d) observing whether or not there is a closed loop of the solid fraction in the article portion; and (e) modifying the cavity shape to eliminate a closed loop of the solid fraction, if any, from the article portion.

11 Claims, 10 Drawing Sheets

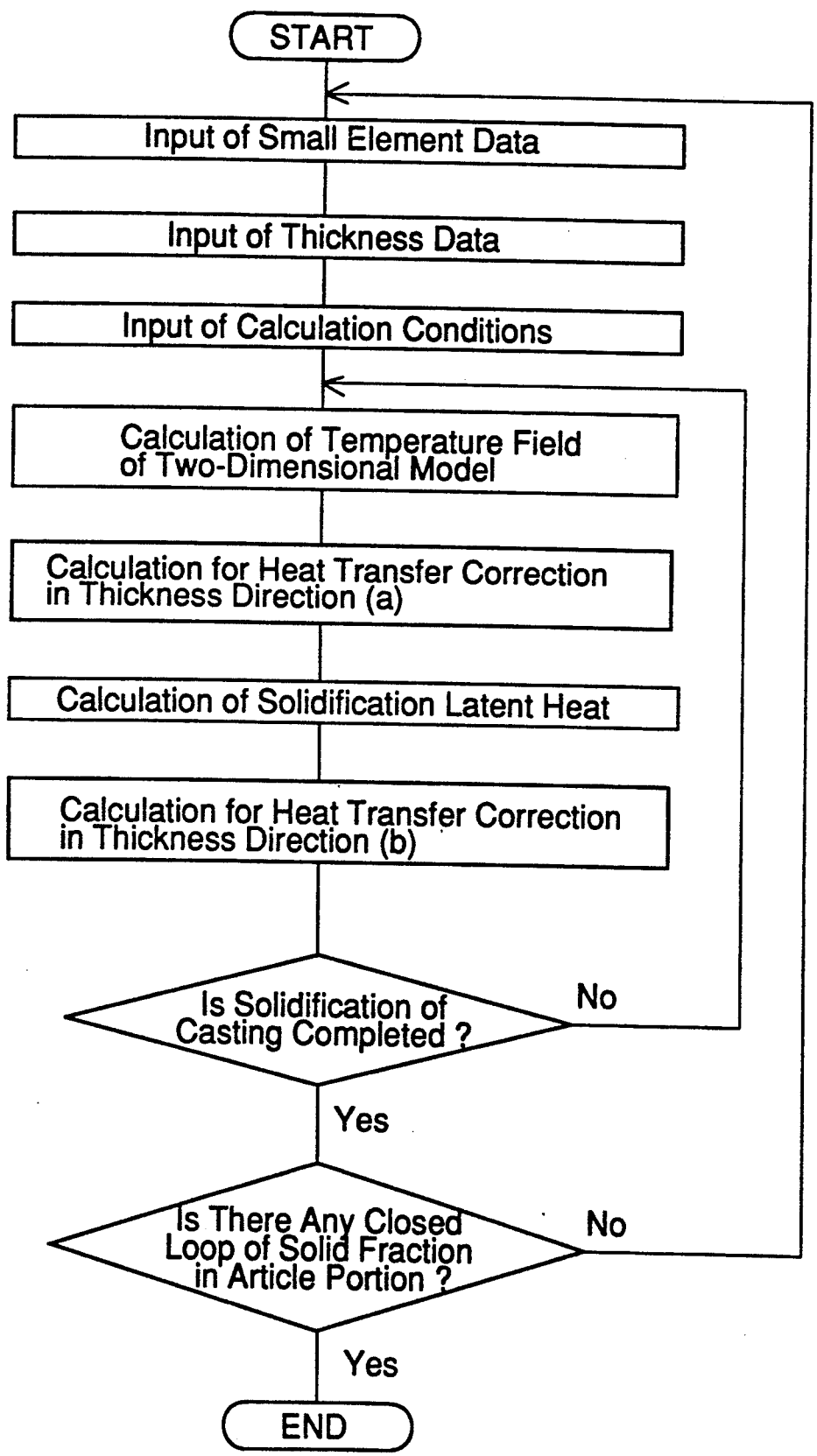

(2 i ii-1)

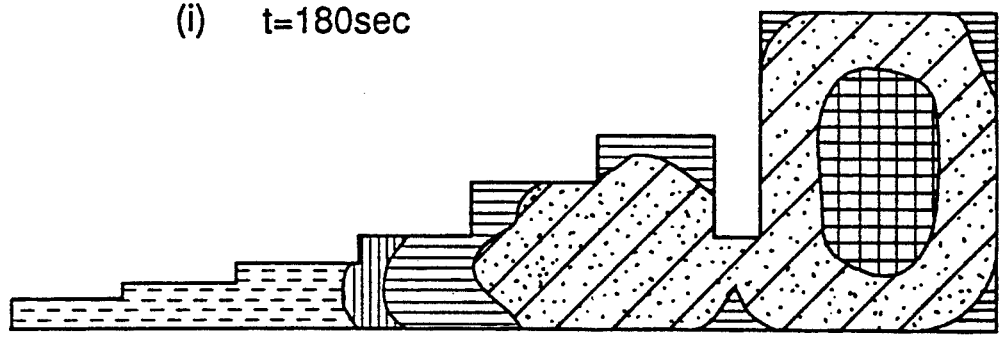
FIG. 3(a)
(i)  t=180sec
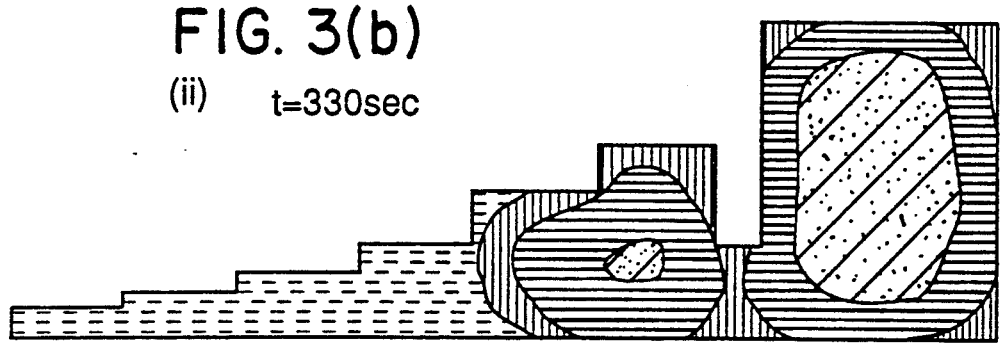
FIG. 3(b)
(ii)  t=330sec
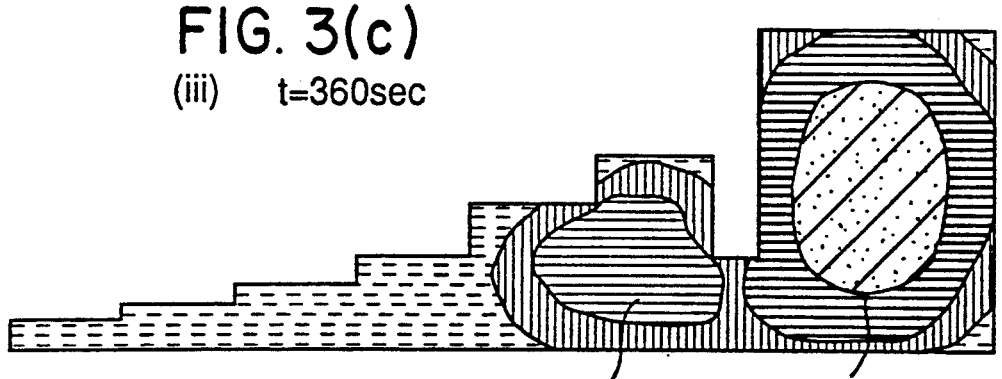
FIG. 3(c)
(iii)  t=360sec
FIG. 3(d)
(iv)  Solidified
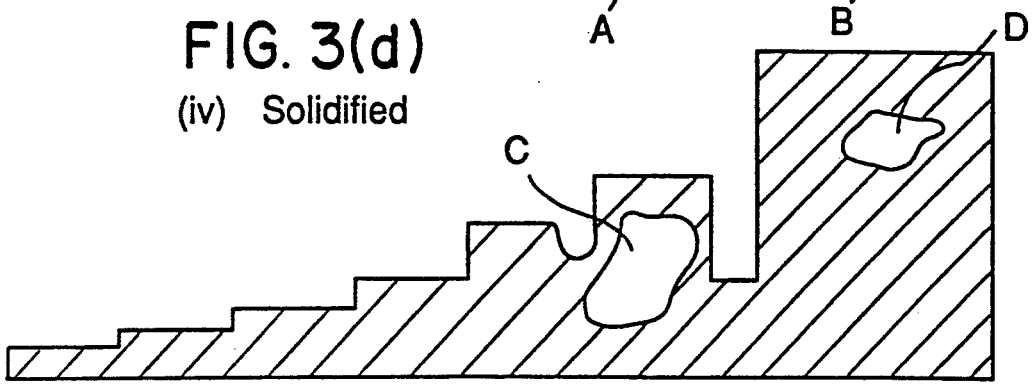

(i)   t=250sec (ii)   t=370sec (iii)   t=450sec

Heat Transfer

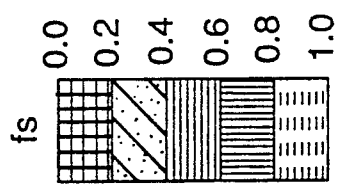
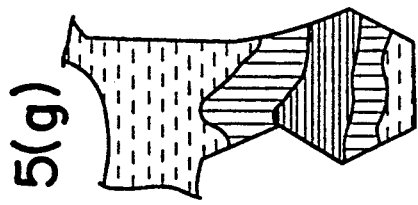
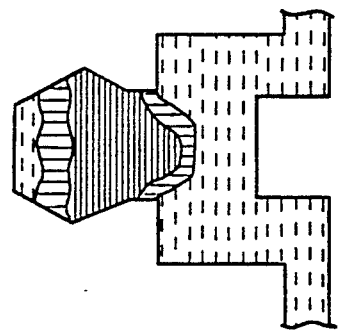
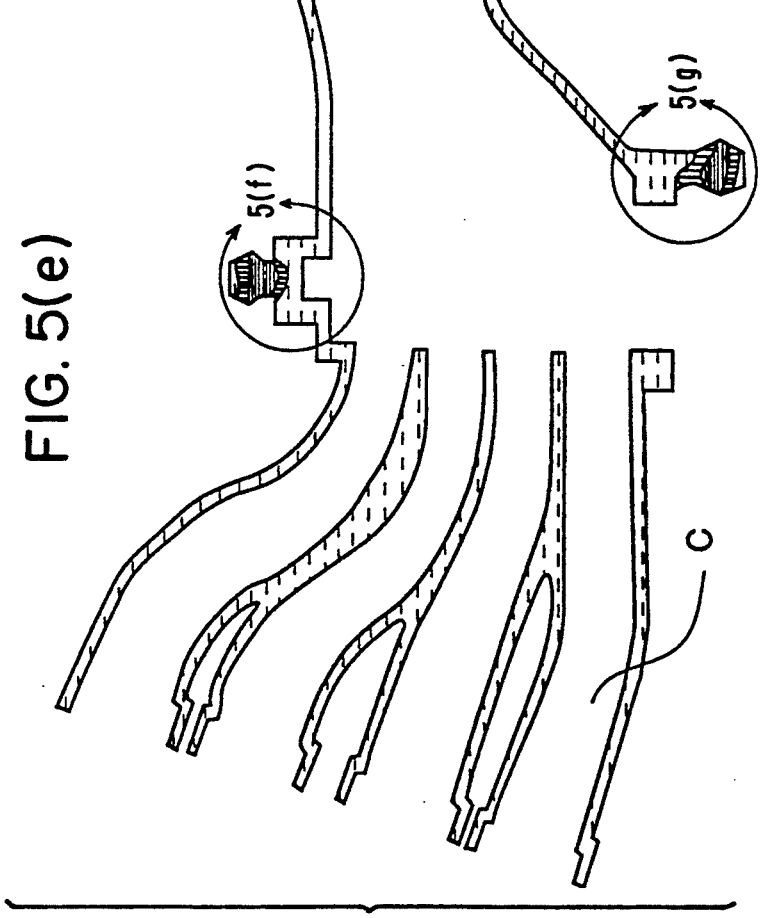
FIG. 5(h)
FIG. 5(f)
FIG. 5(g)
FIG. 5(e)

METHOD OF DESIGNING CAVITY SHAPE OF MOLD

BACKGROUND OF THE INVENTION

The present invention relates to a method of designing a cavity shape of a mold by utilizing solidification analysis particularly for obtaining an optimum cavity shape free from shrinkage cavities in the resulting cast products.

In the solidification analysis by numerical calculation, a system including a casting and a mold is generally represented by a two-dimensional or three-dimensional model consisting of small elements, and the temperature change of all small elements is calculated to conduct the solidification analysis of a casting to be produced.

In the case of the two-dimensional model, the number of steps of preparing the model, the number of calculation steps and calculation cost are small. However, since heat transfer in a three-dimensional direction is not taken into account, its calculation accuracy is inevitably low.

On the other hand, in the case of the three-dimensional model, the calculation accuracy is high due to a three-dimensional approximation, but the model is so large that the number of steps of preparing the model is extremely large, and that the calculation for solid fraction takes too much time, resulting in higher cost of calculation.

In addition, in both two-dimensional model and three-dimensional model, calculation is conducted not only on the casting but also on the mold, leading to enormous numbers of calculation steps. Also, to increase the calculation accuracy, portions in which temperature changes largely should be divided into smaller elements, and in the case of using a sand mold having a small thermal conductivity, smaller elements should be made on the mold near the casting. These matters also lead to larger numbers of calculation steps.

As a means for temperature distribution analysis with reduced number of calculation steps, a heat flux method is known (Eisuke Niiyama, "Castings," Vol. 49, No. 10, 1977). In the heat flux method, the calculation of a mold is eliminated, and the heat flux on a casting surface is numerically calculated with simple boundary conditions taken into account.

In the heat flux method, it is assumed that the casting surface has a constant temperature. However, in a practical casting process, the temperature on the casting surface changes with time in most cases, except for the casting of pure metals without excess heat. As a result, the calculation accuracy is inevitably low. In addition, since an air gap between the casting and the mold is not taken into account, the heat flux method cannot be applied to die casting in which this air gap shows great influence.

OBJECT AND SUMMARY OF THE INVENTION

Accordingly, an object of the present invention is to provide a method of designing a cavity shape of a mold by utilizing solidification analysis, which has a smaller number of calculation steps with higher calculation accuracy, and which is applicable with high accuracy to the casting processes of practical alloys in which the heat flux method shows large discrepancies from the actual castings.

As a result of intense research in view of the above object, the inventors have found that by conducting the unsteady heat transfer calculation on a two-dimensional model according to a heat flux method and correcting the data of the two-dimensional model with the calculation results of heat transfer in a thickness direction, a more accurate solid fraction distribution can be obtained, which makes a measure as to whether or not shrinkage cavities appear in the resulting castings. The present invention is based on this finding.

Thus, the method of designing a cavity shape of a mold according to the present invention by utilizing solidification analysis, comprises the steps of:

(a) preparing a two-dimensional small element model of a casting to be produced in the cavity, the casting including an article portion and a portion connected thereto for feeding a melt to the article portion;

(b) determining a solid fraction distribution of the model by conducting the unsteady heat transfer calculation of the model in the mold by a heat flux method;

(c) correcting the solid fraction distribution by taking into account the heat transfer in a direction perpendicular to the two-dimensional model;

(b) observing whether or not there is a closed loop of the solid fraction in the article portion; and (d) modifying the cavity shape to eliminate a closed loop of the solid fraction, if any, from the article portion.

More specifically, the method of designing a cavity shape of a mold according to the present invention by utilizing solidification analysis, comprising the steps of:

(a) preparing a two-dimensional model consisting of small elements taken along a cross section of a casting to be produced in the cavity, the casting including an article portion to be used as a cast product and a portion connected to the article portion for feeding a melt thereto;

(b) categorizing the small elements constituting the two-dimensional model into a certain number of groups, in each of which the thickness of the casting in a direction perpendicular to the cross section is regarded as approximately the same at any point;

(c) selecting one point representative of all points in each group;

(d) conducting the unsteady heat transfer calculation of the two-dimensional model in a plane including the model;

(e) conducting the heat transfer calculation with respect to each representative point in a direction perpendicular to the two-dimensional model;

(f) correcting the unsteady heat transfer calculation data obtained in the step (d) by the heat transfer data obtained in the step (e) in each group;

(g) repeating the steps (d), (e) and (f) until the solidification of the casting is completed, to determine a solid fraction distribution at each solidification stage;

(h) observing whether or not there is a closed loop of the solid fraction in the article portion; and (i) modifying the cavity shape to eliminate a closed loop of the solid fraction, if any, from the article portion.

BRIEF DESCRIPTION OF THE DRAWINGS

FIG. 1 is a flow chart of numerical analysis in the method of the present invention;

FIGS. 3(a)-3(d) are a set of cross-sectional views for showing the change of a solid fraction distribution with time calculated by the method of the present invention;

FIGS. 5(e)-5(h) are cross-sectional views showing the calculation results of solid fraction made on an exhaust manifold casting.

DETAILED DESCRIPTION OF THE INVENTION

The method of designing a cavity shape of a mold by utilizing solidification analysis is conducted by the calculation steps as shown by the flow chart of FIG. 1.

(1) Input of small element data

Figure 2A:
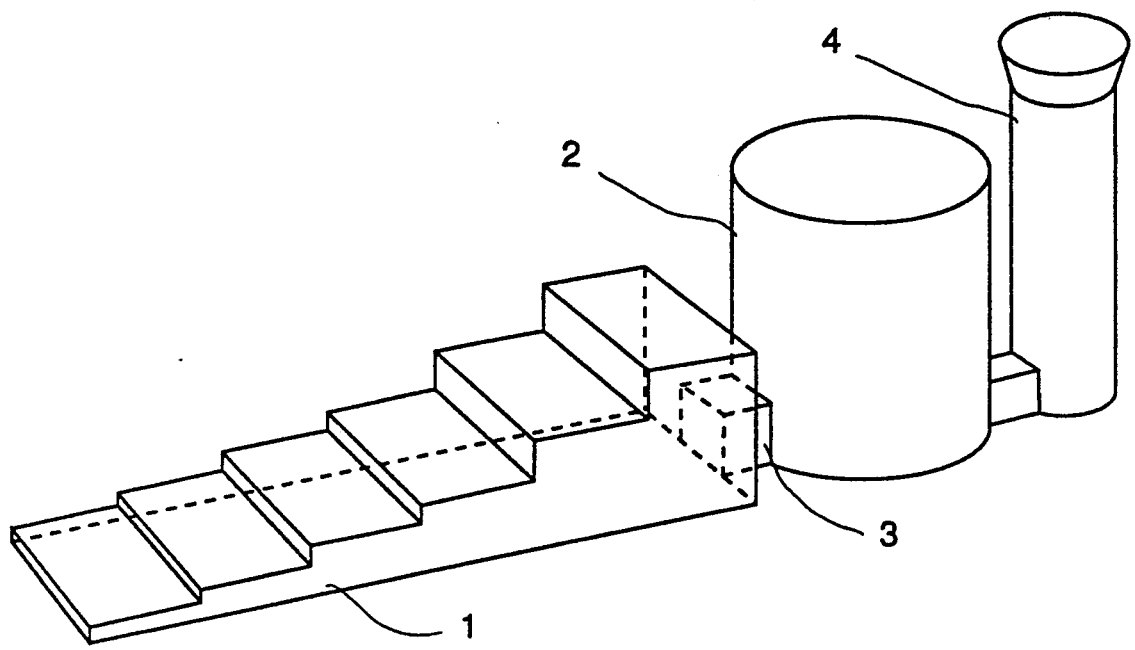
FIG. 2(a) is a perspective view showing a casting on which heat transfer calculation is conducted.
Figure 2B:
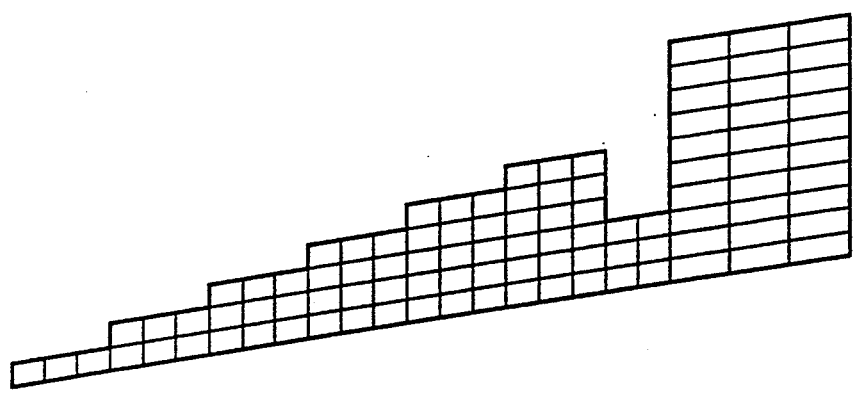
FIG. 2(b) is a schematic view showing a two-dimensional model taken along a vertical center cross section of the casting in FIG. 2(a)

The casting including an article portion, a riser and a gate between the article portion and the riser is hypothetically cut along a proper plane to obtain a cross section, which is divided into small elements as a two-dimensional model. For instance, if the casting has a shape as shown in FIG. 2(a), the two-dimensional model is preferably taken along a vertical center cross section of the casting as shown in FIG. 2(b). In FIG. 2(a), the casting is constituted by an article portion 1 which is to be used as a cast product, a riser 2 functioning to feed a melt to the article portion 1, a gate 3 connecting the article portion 1 and the riser 2, and a runner 4 through which a melt is poured into a cavity of a mold. The two-dimensional model includes not only the article portion 1 but also the riser 2 and the gate 3 to obtain an accurate solid fraction distribution. However, the runner 4 may be excluded from the two-dimensional model because it exerts substantially no influence on the calculation results.

(2) Input of thickness data

Figure 2C:
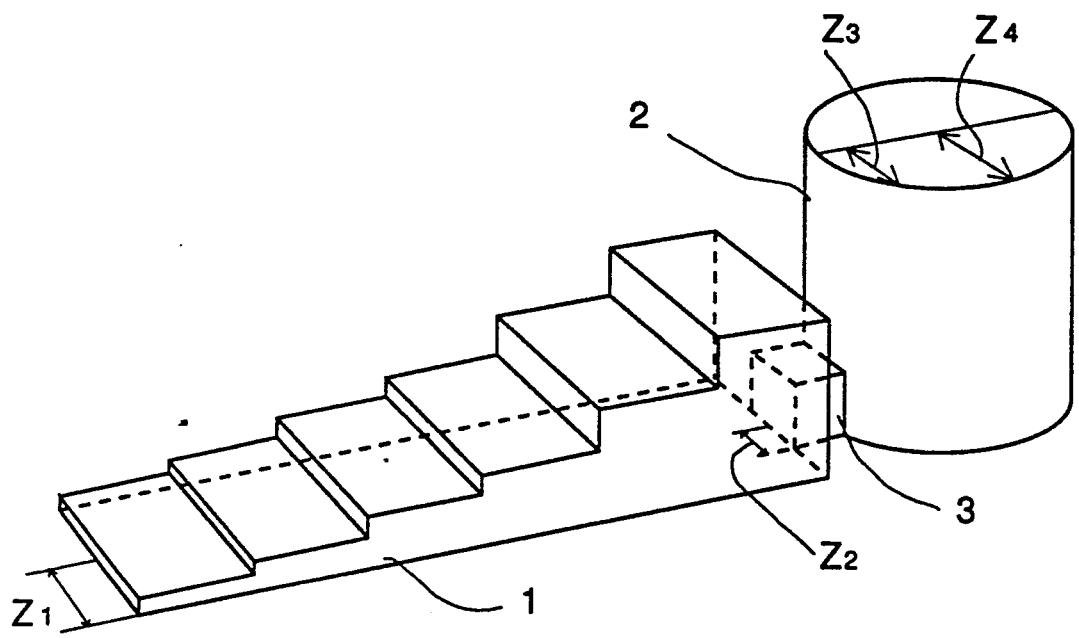
FIG. 2(c) is a perspective view showing a thickness of each element group of the casting in FIG. 2(a)
Figure 2D:
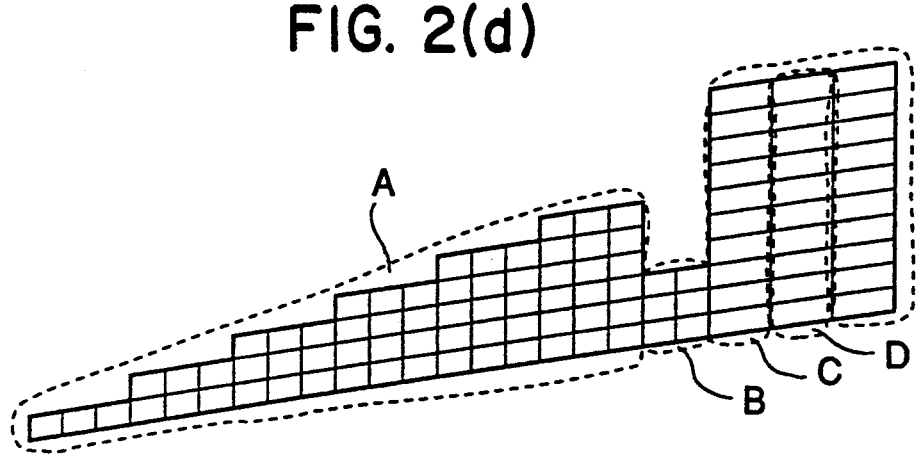
FIG. 2(d) is a schematic view showing groups into which small elements of the two-dimensional model are classified.
Figure 2E:
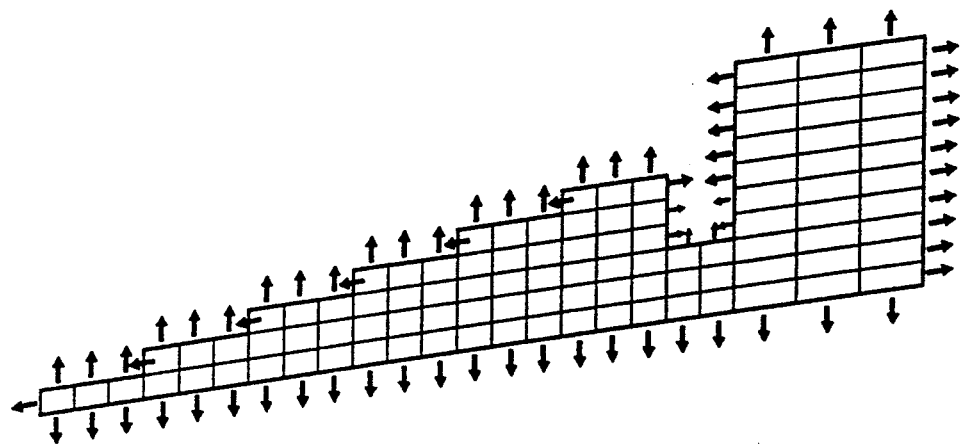
FIG. 2(e) is a schematic view showing heat flux on the two-dimensional model.
Figure 2F:
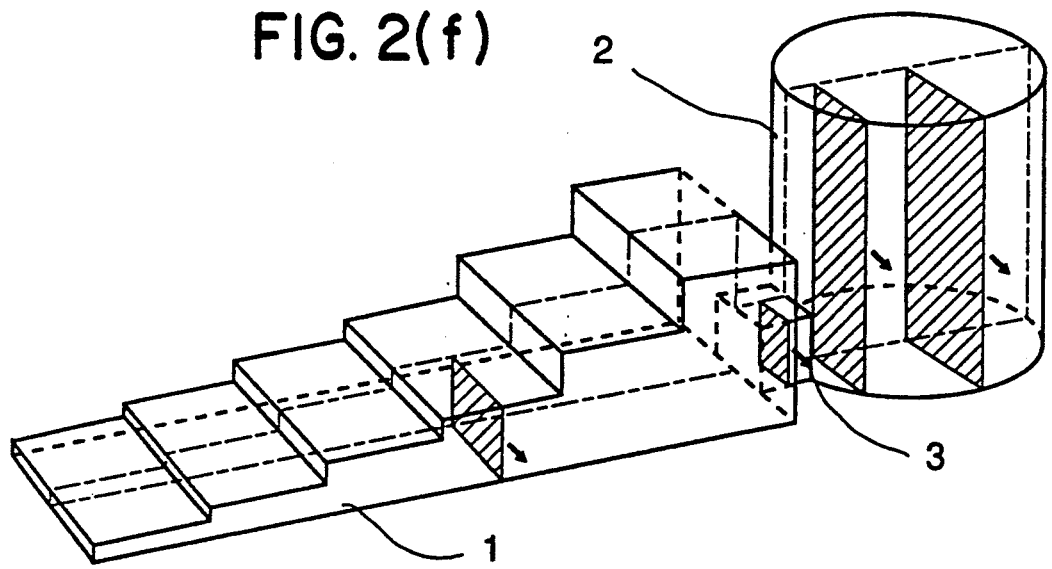
FIG. 2(f) is a schematic view showing a transverse cross section of each group along which heat transfer calculation with respect to a representative point is conducted.
Figure 2G:
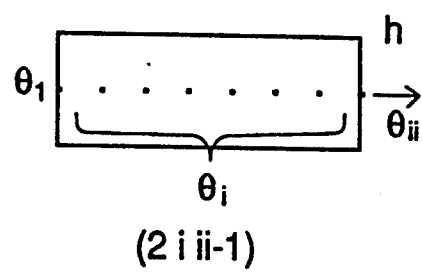
FIG. 2(g) is a schematic view showing the heat transfer calculation along the transverse cross section in FIG. 2(f)

Small elements of the two-dimensional model are categorized into a certain number of groups in which each small element has the same thickness. In the case of the two-dimensional model shown in FIG. 2(b), for instance, the small elements are categorized into four groups A, B, C and D, and the elements in groups A-D have thickness $Z_1$, $Z_2$, $Z_3$, $Z_4$, respectively, as shown in FIG. 2(c) and (d).

In each group, a certain point in the element is selected to conduct the unsteady heat transfer calculation in a thickness direction. Such a point may be any point in the element, but a node formed by lines constituting the small elements is preferably used. Since any point or node can represent the elements in one group, such point or node is called "representative point or node" herein.

Accordingly, thickness data with respect to all representative nodes are read as input data.

(3) Input of calculation conditions

Calculation conditions such as time intervals at which calculation is conducted, calculation completion time, etc. and properties of casting materials and mold materials such as density, specific heat, thermal conductivity, solidification characteristics, etc. are read as input data.

(4) Calculation of temperature field of two-dimensional model

The calculation of the temperature field of the two-dimensional model is conducted by taking into account heat transfer on the casting surface by means of an unsteady heat transfer equation under boundary conditions obtained by a finite element method.

The unsteady heat transfer equation is expressed as follows:

$$\rho c \frac{\partial T}{\partial t} = \lambda \left( \frac{\partial^2 T}{\partial x^2} + \frac{\partial^2 T}{\partial y^2} \right), \quad (1)$$

wherein
 $\rho$: Density of casting,
 c: Specific heat of casting,
 $\lambda$: Thermal conductivity of casting,
 T: Temperature of casting,
 t: Lapsed time,
 x: X coordinate, and
 y: Y coordinate.

With respect to small elements obtained by dividing an object (two-dimensional model) to be analyzed, a temperature distribution in the elements is expressed by the following equation:

$$T(x, y, t) = [N(x, y)]\{\phi(t)\}, \quad (2)$$

wherein
 T: Temperature inside the element,
 [N]: Interpolation function matrix connecting a node temperature and a temperature inside the element, and
 $\{\phi\}$: Node temperature vector of the element at time "t."

In this case, the finite element equation of the element is expressed as follows:

$$[k]\{\phi\} + [c]\left(\frac{\partial \phi}{\partial t}\right) = \{f\}, \quad (3)$$

$$[k] = \int_V \lambda \left( \frac{\partial [N]^T}{\partial x} \frac{\partial [N]}{\partial x} + \frac{\partial [N]^T}{\partial y} \frac{\partial [N]}{\partial y} \right) dV, \quad (4)$$

$$[c] = \int_V \rho c [N]^T [N] dV. \quad (5)$$

With respect to the element on the surface, $$\{f\} = -\int_S q[N]^T dS. \quad (6)$$

With respect to the element inside the two-dimensional model, $$\{f\} = 0. \quad (7)$$

$[N]^T$: Transformation matrix of $[N]$,
$\lambda$: Thermal conductivity of casting,
$\rho$: Density of casting,
$c$: Specific heat of casting,
$q$: Heat flux on surface,
$V$: Region including all elements of two-dimensional model, and
$S$: Line enclosing $V$ in two-dimensional model.

When there is heat transfer on the surface, the boundary conditions are expressed by the following equation:

$$q = \alpha(T - Tc), \quad (8)$$

wherein
$\alpha$: Thermal conductivity of casting surface,
$T$: Temperature of casting surface, and
$Tc$: Outside temperature.

From (2) and (8), the equation (9) is expressed as follows:

$$\int_V q[N]^T dS = \int_S \alpha [N]^T [N] dS \cdot \{\phi(t)\} - \int_S \alpha Tc[N]^T dS. \quad (9)$$

From (9), the equation (4) and (6) are expressed as follows:

$$[k] = \int_V \lambda \left( \frac{\partial [N]^T}{\partial x} \frac{\partial [N]}{\partial x} + \frac{\partial [N]^T}{\partial y} \frac{\partial [N]}{\partial y} \right) dV + \int_S \alpha [N]^T [N] dS. \quad (10)$$

$$\{f\} = \int_S \alpha Tc[N]^T dS. \quad (11)$$

From thermal properties of the mold and lapsed time, the thermal conductivity $\alpha$ on the casting surface is expressed as follows:

$$\alpha = 0.5642 \times B/\sqrt{0.25 \Delta t} \quad (t = 0), \quad (12)$$

$$= 0.5642 \times B/\sqrt{t} \quad (t > \Delta t), \quad (13)$$

when there is no air gap.
On the other hand, when there is an air gap, $$\alpha = \frac{1}{\frac{1}{\alpha'} + \frac{1}{\alpha_0}},$$

wherein
$B = \rho' c' \lambda'$
$\Delta t$: Time interval at which calculation is conducted,
$t$: Lapsed time,
$\rho'$: Specific heat of mold,
$c'$: Density of mold,
$\lambda'$: Thermal conductivity of mold,
$\alpha'$: Heat transfer coefficient when there is no air gap, and
$\alpha_0$: Heat transfer coefficient of air gap.

From the finite element equation of the element including the boundary conditions on the casting surface expressed by the matrix equations (3), (10), (5), (11) and (7), an finite element equation (14) for all elements is provided as follows:

$$[K]\{\Phi\} + [C]\left\{ \frac{\partial \Phi}{\partial t} \right\} = \{F\}, \quad (14)$$

wherein
$\{\Phi\} = \Sigma\{\phi\}$,
$[K] = \Sigma[k]$,
$[C] = \Sigma[c]$, and
$\{F\} = \Sigma\{f\}$.

The equation (14) is solved by Crank-Nicolson equation.

(5) Calculation for heat transfer correction in thickness direction (a)

With respect to a representative element in each group of small elements obtained in (2), its cross section in a thickness direction (transverse cross section) is considered, and heat transfer through this transverse cross section is calculated by a implicit finite difference method. The calculation results are applied to the other elements in the same group, in order to correct the calculation results of the temperature field of the two-dimensional model obtained in the step (4).

Incidentally, the calculation method of heat transfer in a thickness direction is applicable to the calculation of the temperature filed by means of a implicit finite difference method, and other calculation for boundary conditions and solidification latent heat described later in connection with the step (6).

Specifically, with respect to heat balance in a thickness direction from time "t" to time "t+$\Delta$t," it is expressed by the following equation:

$$\theta'_n = (G/(1+2G))(\theta'_{n-1} + \theta'_{n+1}) + (1 - 2(G/(1+2G)))\theta_n, \quad (15)$$

$$G = k\Delta t / \rho c \Delta x^2,$$

wherein
$\theta_n$: Temperature at a position "n" at time "t,"
$\theta'_n$: Temperature at a position "n" at time "t+$\Delta$t,"
$\Delta x$: Distance by which calculation is conducted,
$\rho$: Density, and
$c$: Specific heat.

With respect to three points in the transverse cross section: one point at an edge on the side of the two-dimensional model, one point at the opposite edge, and one point between the above two points, the following simultaneous equations are provided from the equation (15):

$$\theta'_1 = \theta_1 + 2G_1(\theta'_2 - \theta'_1), \quad (16)$$

$$\theta'_{ii} = \theta_{ii} + 2G_1(\theta'_{ii-1} - \theta'_{ii}) + 2G_{ii}(T_c - \theta'_{ii}), \quad (17)$$

$$\theta'_i = \theta_i + G_1(\theta'_{i-1} - 2\theta'_i + \theta'_{i+1}), \quad (18)$$

$$(2 \leq i \leq ii-1),$$

wherein
- $\theta'_1$: Temperature at a point between both ends at time "t+Δt,"
- $\theta_1$: Temperature at a point between both ends at time "t,"
- $\theta'_{ii}$: Temperature of node on the opposite side of two-dimensional model at time "t+Δt,"
- $\theta_{ii}$: Temperature of node on the opposite side of two-dimensional model at time "t,"
- ii: Number of points of transverse cross section,
- $\theta'_i$: Temperature of node on the side of two-dimensional model at time "t+Δt,"
- $\theta_i$: Temperature of node on the side of two-dimensional model at time "t,"
- $G_1$: $k_1 \Delta t / \rho c \Delta x^2$,
- $G_{ii}$: $h\Delta t / \rho c \Delta x$,
- h: Heat transfer coefficient, and
- Tc: Outside temperature.

By solving the simultaneous equations (16)–(17), temperature drop of the two-dimensional model due to heat transfer is calculated.

The temperature change due to heat transfer in the two-dimensional model and the temperature drop due to heat transfer along the cross section in a thickness direction have a close correlation. Specifically, the temperature of the two-dimensional model cross section changes due to heat transfer in a thickness direction, and the temperature of the cross section in a thickness direction also changes due to heat transfer in a direction perpendicular to the thickness direction. In this calculation, since the correction calculation due to solidification latent heat is conducted in the subsequent step (6), the temperature of the two-dimensional model cross section is corrected first and the temperature correction in the cross section in a thickness direction is conducted in the subsequent step (6). Their relations are as follows.

$$T' = T + (\theta'_1 - \theta''_1), \quad (19)$$

$$\theta' = \theta + (T - T'), \quad (20)$$

wherein
- T': Temperature (after correction) of small element in two-dimensional model at time "t+Δt,"
- T: Temperature (before correction) of small element in two-dimensional model at time "t+Δt,"
- $\theta'_1$: Temperature (after correction) of small element of a transverse cross section at the inner end on the side of two-dimensional model cross section at time "t+Δt,"
- $\theta''_1$: Temperature (after correction) of small element of a transverse cross section at the inner end on the side of two-dimensional model cross section at time "t,"
- $\theta'$: Temperature (after correction) of small element of a transverse cross section at time "t+Δt,"
- $\theta$: Temperature (before correction) of small element of a transverse cross section at time "t+Δt," and
- T'': Temperature (after correction) of small element of two-dimensional model at time "t."

(6) Calculation of solidification latent heat

The influence of latent heat generated in the solidification process of the casting is taken into account by a temperature recovery method to correct the calculation results of solid fraction. The details of this temperature recovery method are described in "Introduction to Heat Transfer and Solidification Analysis by Computers," Itsuo Ohnaka, 1985, pp. 202–203.

(7) Heat transfer correction calculation in thickness direction (b)

By the equation (20) in the above step (6), temperature correction in the transverse cross section is carried out.

(8) The above steps (4), (5), (6) and (7) are repeated until the solidification of the casting is completed. As a result, a solid fraction distribution is obtained. As shown in FIG. 3, the solid fraction distribution changes with time. In the process of solidification, if there appears a closed loop of solid fraction, shrinkage cavities are likely to be formed. Accordingly, it is extremely important to exactly know whether or not there is a closed loop of solid fraction.

(9) Modification of Cavity Shape

If there is a closed loop of solid fraction, the cavity shape should be modified. The modification of the cavity shape is typically carried out by increasing the height, diameter, volume, etc. of the riser. Alternatively, a shape of an article portion may also be changed such that the closed loop of solid fraction disappears. Apart from these methods, any modification can be made to any part of the casting including the article portion, the gate and the riser.

With respect to the solid fraction whose closed loop is likely to generate shrinkage cavities, it is 0.6 or less in the case of embodiments shown herein. However, it may vary depending upon the materials of castings. Accordingly, the numerical value of solid fraction should be determined based on the materials of castings used, and whether or not the modification of cavity shape is necessary is determined based on whether or not there is a closed loop of solid fraction having such a numerical value.

The calculation is conducted by repeating the steps (1)–(8) on a modified cavity shape, in order to obtain a cavity shape in which a closed loop of solid fraction of 0.6 or less does not appear in the process of solidification.

The present invention will be described in further detail by the following Examples.

EXAMPLE 1

With respect to the casting shown in FIG. 2(a), solid fraction was obtained by the method of the present invention and conventional two-dimensional model and three-dimensional model methods. The time necessary for preparing a model, the number of elements, calculation time and calculation accuracy are shown in Table 1.

TABLE 1

|  | Present Invention | Conventional Two-Dimensional Model | Conventional Three-Dimensional Model |
|---|---|---|---|
| Time Necessary for Preparing Model | 2.2 Hours | 2 Hours | 4 Hours |
| Number of | 268 | 268 | 1048 |

TABLE 1-continued

| | Present Invention | Conventional Two-Dimensional Model | Conventional Three-Dimensional Model |
|---|---|---|---|
| Elements Calculation Time (Sec) | 14.98 | 14.90 | 225.0 |
| Calculation Accuracy | High* | Low | High |

*As high as the calculation accuracy of the three-dimensional model.

It is clear from Table 1 that the method of the present invention enjoys as high calculation accuracy as in the three-dimensional model method, with as small number of elements and calculation time as in the two-dimensional model method.

Figure 3H:
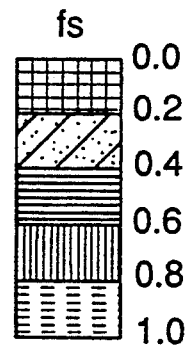
FIGS. 3(e)-3(h) are a set of cross-sectional views for showing the change of a solid fraction distribution with time calculated by a conventional two-dimensional model method.
Figure 3E:
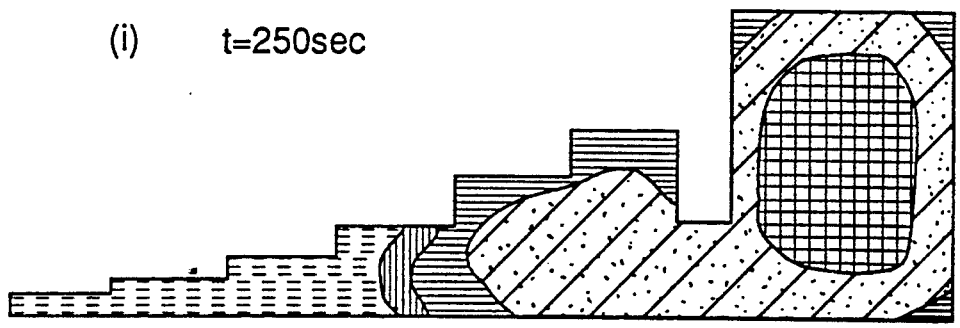
Figure 3F:
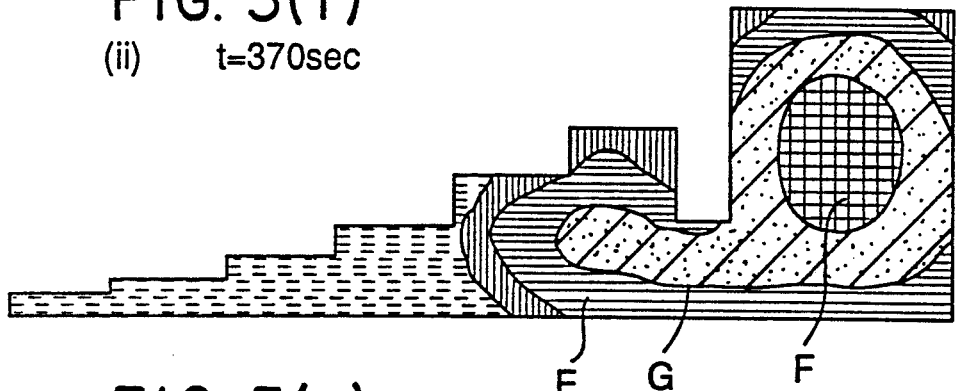
Figure 3G:
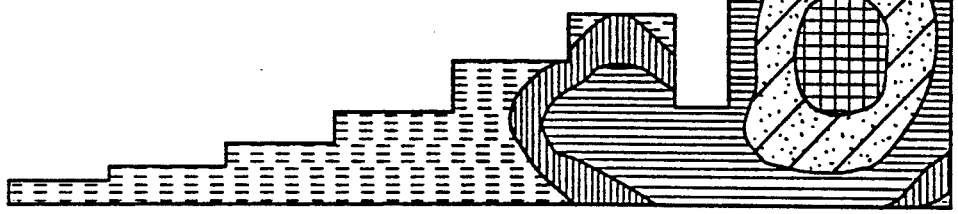

Next, FIG. 3(a) shows the calculation results of solid fraction $f_s$ in the solidification process obtained by the method of the present invention, and FIG. 3(b) shows the calculation results of solid fraction $f_s$ obtained by the conventional two-dimensional model method. In FIG. 3(a), final solidifying portions A, B correspond to shrinkage cavities C, D. Particularly, the solidifying portion A, which is in a closed loop of solid fraction of 0.6 or less, should be paid attention because it is inside an article portion to be used as a cast product. On the other hand, in FIG. 3(b), the above closed loop of solid fraction of 0.6 or less does not appear in the article portion. Specifically, since it is shown by calculation that a gate portion G is solidified so slowly that portions E and F are in connection with each other even at the final solidification stage. Accordingly, it cannot be expected from the two-dimensional model method that shrinkage cavities appear in an article portion of the casting. This means that the two-dimensional model method cannot exactly expect whether or not shrinkage cavities are formed in the article portions of the resulting castings.

EXAMPLE 2

With respect to an exhaust manifold casting as shown in FIG. 5, the method of the present invention was applied by using a casting material of stainless steel (SCS13).

Figure 4A:
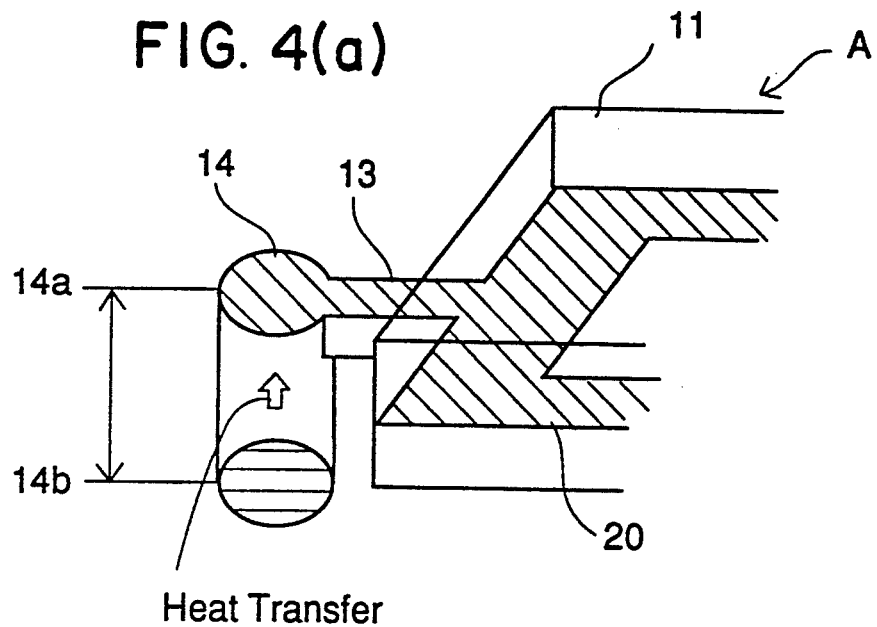
FIG. 4(a) is a schematic view showing the calculation process in a portion A of an exhaust manifold casting in the method of the present invention.
Figure 4B:
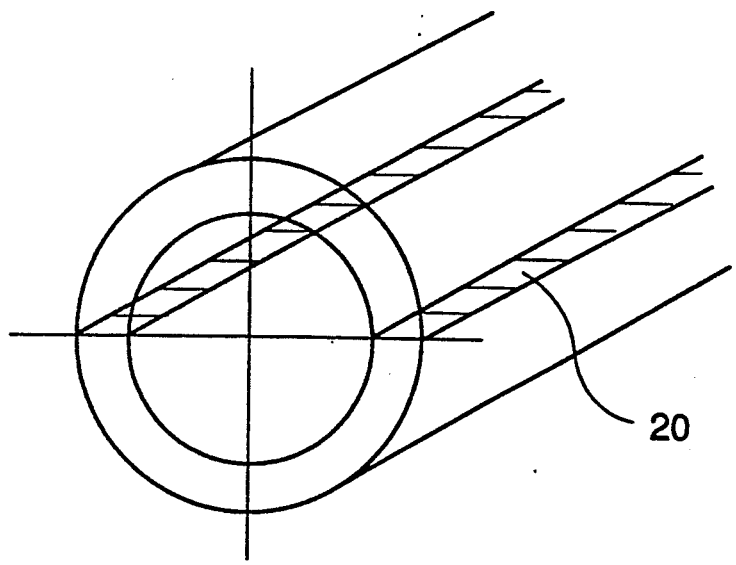
FIG. 4(b) is a schematic view showing the calculation process in a tubular portion C of an exhaust manifold casting in the method of the present invention.

FIG. 4(a) shows a portion A of the exhaust gas manifold shown in FIG. 5. The portion A is connected to a runner 14 via a gate 13. In this case, since a melt is supplied upward through the runner 14, a function of applying pressure to the article portion is performed by the structure shown in FIG. 4(a). Accordingly, the runner 14 also functioned as a riser.

The unsteady heat transfer calculation was conducted in a cross section (two-dimensional model) 20 shown by hatching. The heat transfer in the runner 14 takes place as shown by the arrow. At all calculation steps, the melt temperature at 14b is used. The correction of the above calculation results by heat transfer in a direction perpendicular to the two-dimensional model is then carried out.

With respect to a tubular portion C, there is no heat transfer in a circumferential direction because the tubular portion C is symmetrical in a circumferential direction. Accordingly, the boundary conditions of no heat transfer in a circumferential direction were used.

With respect to the exhaust manifold casting made of SCS13 as shown in FIG. 5, a solid fraction distribution was obtained by the method of the present invention.

The properties of the SCS13 used are shown in Table 2.

TABLE 2

| | Material | |
|---|---|---|
| | SCS 13 | Mold |
| Density (g/cm³) | 7.00 | 1.50 |
| Specific Heat (cal/g · °C.) | 0.155 | 0.227 |
| Thermal Conductivity (cal/cm · sec · °C.) | 0.08 | 0.0015 |
| Latent Heat (cal/g) | 65 | — |
| Liquidus Temperature (°C.) | 1448 | — |
| Solidus Temperature (°C.) | 1417 | — |

Figure 5A:
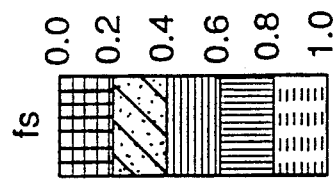
FIGS. 5(a)-5(d) are cross-sectional views showing the calculation results of solid fraction made on an exhaust manifold casting.
Figure 5B:
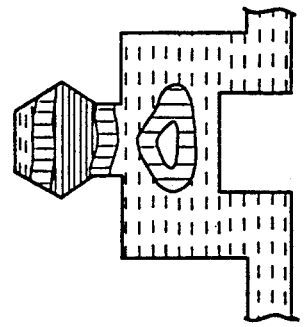
Figure 5C:
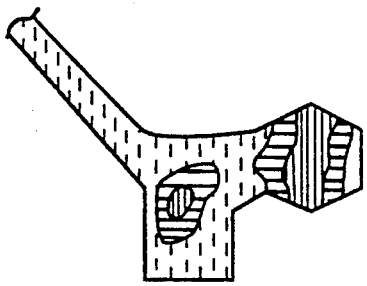
Figure 5D:
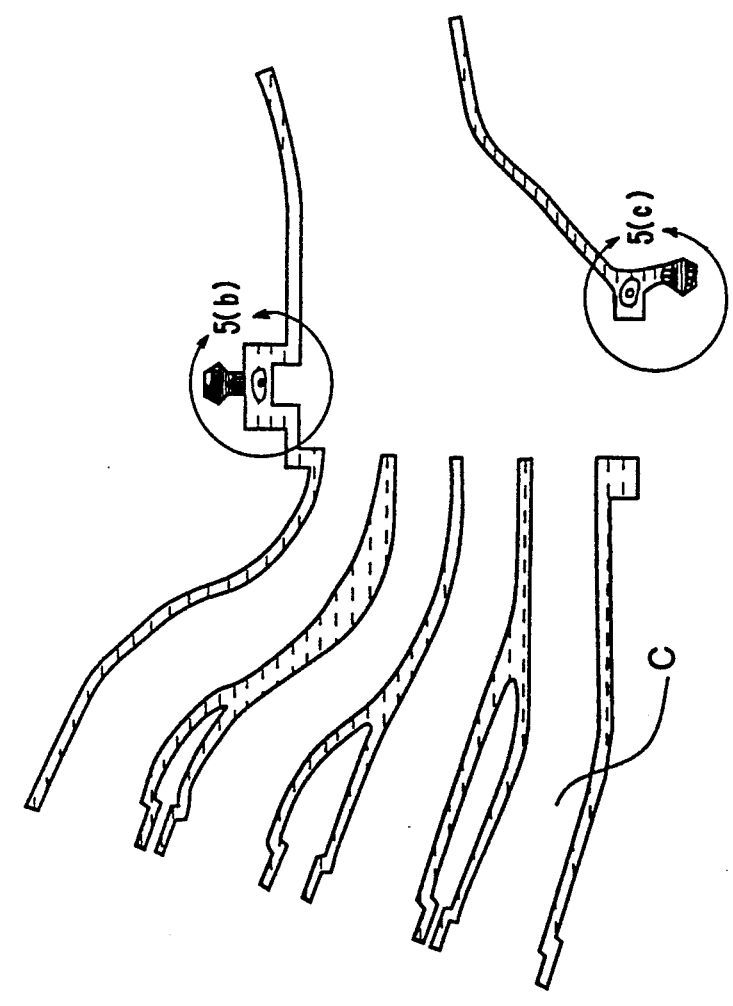
Figure 6A:
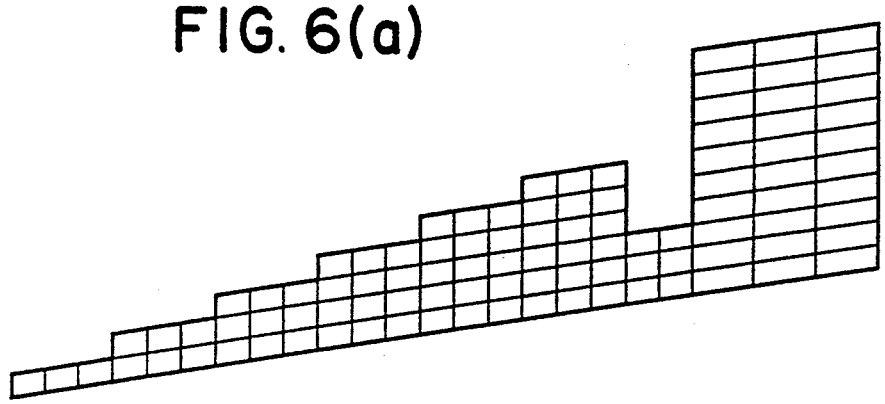
FIGS. 6(a) and 6(b) are perspective views showing conventional two-dimensional and three-dimensional models of the casting in FIG. 2(a).
Figure 6B:
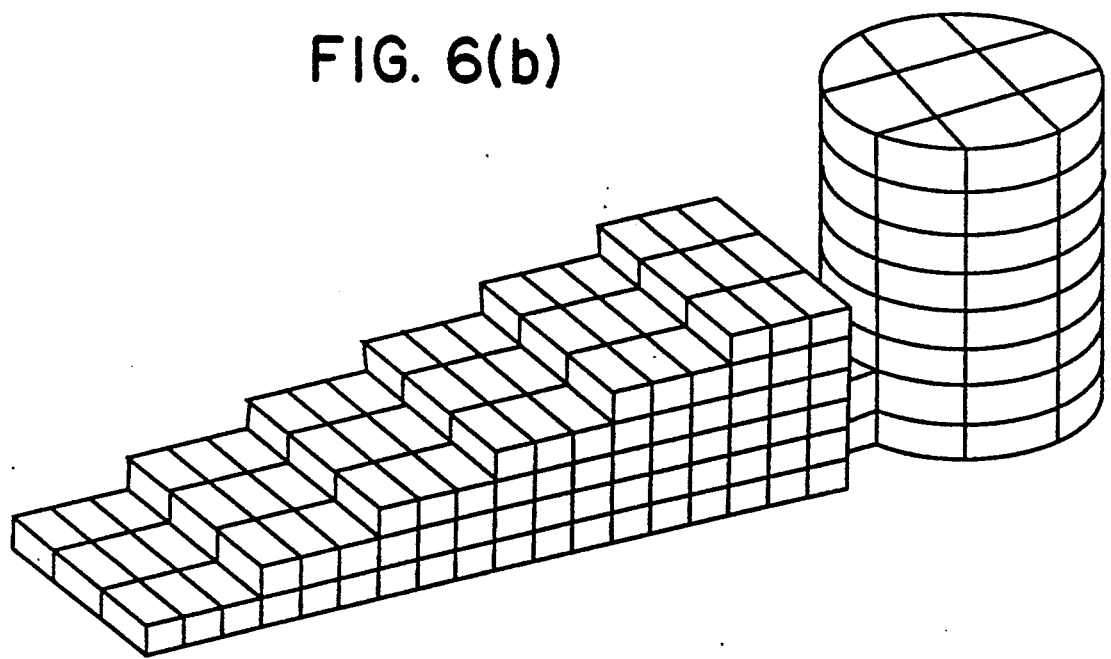

The calculation results are depicted in FIGS. 5(a) and (b). FIG. 5(a) shows the solidification analysis results when a small-diameter runner was used, and FIG. 5(b) shows the solidification analysis results when a runner having a proper diameter was used.

In FIG. 5(a), portions A, B have closed loops of solid fraction, which are separated from the runner. Thus, in these portions shrinkage cavities are likely to appear. On the other hand, in FIG. 5(b), there was no closed loop of solid fraction in A, B, and the solidification progressed toward the riser. Accordingly, good castings can be produced.

As described above in detail, the method of the present invention can expect accurately whether or not shrinkage cavities are likely to appear in the castings, with as small number of calculation steps and as short time as in the conventional two-dimensional model method. Nevertheless, the calculation accuracy of the method of the present invention is as high as that of the three-dimensional model method.

By the method of the present invention, a desired cavity shape free from shrinkage cavities can be designed accurately without suffering from large costs.

What is claimed is:

1. A method of designing a cavity shape of a mold by utilizing solidification analysis, comprising the steps of:
   (a) preparing a two-dimensional small element model of a casting to be produced in said cavity, said casting including an article portion and a portion connected thereto for feeding a melt to said article portion
   (b) determining a solid fraction distribution of said model by conducting the unsteady heat transfer calculation between said casting and said mold in said two-dimensional model by a heat flux method;
   (c) correcting said solid fraction distribution by calculation results of heat transfer in a direction perpendicular to said two-dimensional model obtained by accounting for cavity size in a direction perpendicular to said two-dimensional model;
   (d) observing whether or not there is a closed loop of said solid fraction in said article portion; and
   (e) modifying said cavity shape to eliminate a closed loop of said solid fraction, if any, from said article portion.

2. The method of designing a cavity of a mold according to claim 1, wherein the modification of said cavity shape is conducted to eliminate a closed loop of solid fraction of 0.6 or less.

3. The method of designing a cavity shape of a mold according to claim 1, wherein said casting includes an article portion to be used as a cast product, a riser and a gate connecting said article portion to said riser.

4. The method of designing a cavity shape of a mold according to claim 1, wherein the modification of said cavity shape is conducted by changing at least the position, height or volume of said riser.

5. The method of designing a cavity shape of a mold according to claim 1, wherein the unsteady heat transfer calculation of said model by selecting at least one small element of said casting in contact with the cavity, and calculating the heat flux said casting to said mold with casting conditions concerning the thermal properties of said mold, temperature and time taken into account.

6. The method of designing a cavity shape of a mold according to claim 1, wherein said heat flux is determined with an air gap between said casting and said mold taken into account.

7. A method of designing a cavity shape of a mold by utilizing solidification analysis, comprising the steps of:
(a) preparing a two-dimensional model consisting of small elements taken along a cross section of a casting to be produced in said cavity, said casting including an article portion to be used as a cast product and a portion connected to said article portion for feeding a melt thereto;
(b) categorizing said small elements constituting said two-dimensional model into a certain number of groups, in each of which the thickness of said casting in a direction perpendicular to said cross section is regarded as approximately the same at any point;
(c) selecting one point representative of all points in each group;
(d) conducting the unsteady heat transfer calculation of said two-dimensional model in a plane including said model;
(e) conducting the heat transfer calculation with respect to each representative point in a direction perpendicular to said two-dimensional model;
(f) correcting the unsteady heat transfer calculation data obtained the step (d) by the heat transfer data obtained in the step (e) in each group;
(g) repeating the steps (d), (e) and (f) until the solidification of said casting is completed, to determine a solid fraction distribution at each solidification stage;
(h) observing whether or not there is a closed loop of said solid fraction in said article portion; and
(i) modifying said cavity shape to eliminate a closed loop of said solid fraction, if any, from said article portion.

8. The method of designing a cavity shape of a mold according to claim 7, wherein the modification of said cavity shape is conducted to eliminate a closed loop of solid fraction of 0.6 or less.

9. The method of designing a cavity shape of a mold according to claim 7, wherein said casting includes an article portion to be used as a cast product, a riser and a gate connecting said article portion to said riser.

10. The method of designing a cavity shape of a mold according to claim 7, wherein the modification of said cavity shape is conducted by changing at least the position, height or volume of said riser.

11. The method of designing a cavity shape of a mold according to claim 7, wherein said heat flux is determined with an air gap between said casting and said mold taken into account.

* * * * *

UNITED STATES PATENT AND TRADEMARK OFFICE
CERTIFICATE OF CORRECTION

PATENT NO. : 5,227,979
DATED : July 13, 1993
INVENTOR(S) : Makoto Fukuhira et al.

It is certified that error appears in the above-identified patent and that said Letters Patent is hereby corrected as shown below:

Claim 5, col. 11, line 7, after "flux" insert --from--.

Signed and Sealed this

Fifteenth Day of March, 1994

Attest:

BRUCE LEHMAN

*Attesting Officer*   *Commissioner of Patents and Trademarks*